Aug. 31, 1954   W. L. STAHL ET AL   2,688,116
VOLTAGE MEASURING APPARATUS
Filed March 9, 1953
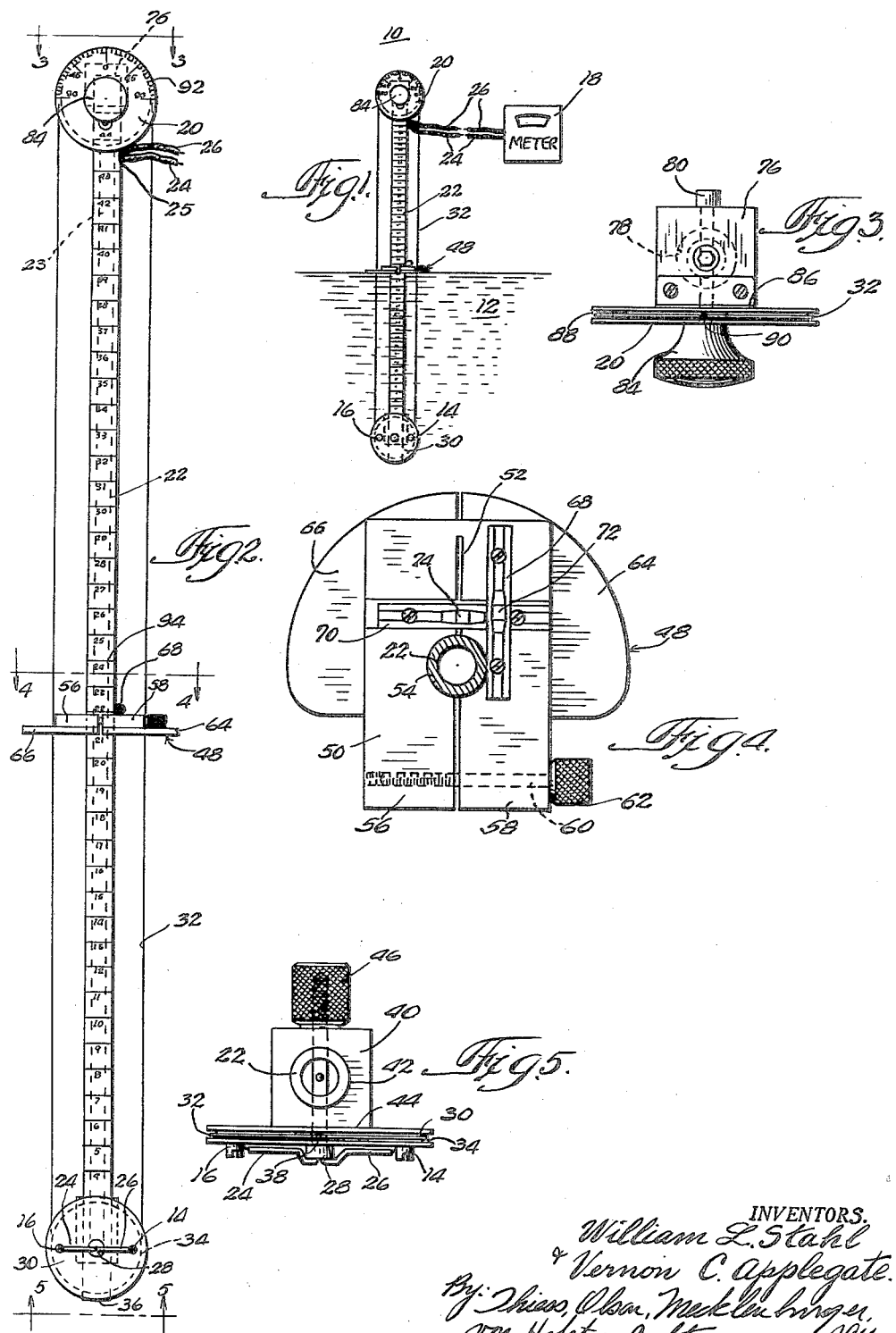
INVENTORS.
William L. Stahl
& Vernon C. Applegate.

Patented Aug. 31, 1954

2,688,116

UNITED STATES PATENT OFFICE 2,688,116

VOLTAGE MEASURING APPARATUS

William L. Stahl, Ypsilanti, and Vernon C. Applegate, Rogers City, Mich., assignors to United States of America Application March 9, 1953, Serial No. 341,062

10 Claims. (Cl. 324—29)

This invention relates to voltage measuring apparatus, and more particularly to a voltage gradient measuring probe.

It is an important object of this invention to provide improved apparatus for determining the characteristics of electrical fields in a fluid medium. It is often desirable to create an electrical field in a fluid body. Such a field is established in various electroplating processes, in various types of electrical discharge devices, and in fluid bodies which are artificially controlled to produce a predetermined wild life environment therein. While this invention will hereinafter be described with reference to one particular embodiment and use, namely a probe for determining the character of an electric field in a stream or similar body of water, it should be clear that many variations and uses will be available to one skilled in the art in the light of this disclosure.

It has been found that by establishing an electrical field in a stream or other similar body of water the migration and activity of various aquatic animals may be selectively controlled. Depending upon the complexity of an aquatic animal's nervous system, its size, and the stage of its life, it will exhibit a varying sensitivity to a voltage gradient present in the water body in which it is swimming. Generally, migratory fish have highly sensitive nervous systems and react to relatively low field strengths in a stream body. Migratory fish of average size are usually affected by voltage gradients as low as 0.1 volt per inch. If this voltage gradient is a D. C. field it has been found that fish such as trout, pike, and carp are attracted to the positive electrode or anode of the electric field. If an A. C. field is established in such a water body it is found that such fish are repelled by the electric charge and will attempt to isolate themselves from the field effects. Certain other animals, such as the predatory sea lamprey which is currently vexing the Great Lakes fishing industry, have a primitive nervous system and are relatively insensitive to large magnitude voltage gradients. It is found that the lamprey will continue migratory activity within an electrified body of water until the voltage gradient is of sufficient magnitude to produce muscular tetanus or electronarcosis, at which time the lamprey will be temporarily paralyzed. If this paralysis is sufficiently prolonged the lamprey will die of suffocation or be carried out of the electric field by normal stream currents, where it may revive and re-enter the electrified area until ultimately a sufficient period of paralysis is established to result in its demise through suffocation. A voltage gradient of approximately 0.75 volt per inch is found sufficient to result in paralysis of the sea lamprey where they are exposed to the field for approximately five seconds.

Therefore the segregation of predatory aquatic animals from migratory fish may be scientifically effected by the establishment of predetermined electric fields in a stream body in which both migratory fish and predatory aquatic animals are known to be present. This may be accomplished by one of several methods. An incrementally increasing voltage field may be established across a stream whereby a low voltage gradient may be established to first repel migratory fish and a substantially increased voltage gradient exists in an upstream area which will be sufficient to destroy predatory aquatic animals which have transgressed the lower electric field having reduced field strength.

To prevent tetanic paralysis or electronarcosis in valuable game fish and to insure the capture or demise of the predatory aquatic animals it is necessary to accurately control the gradients in various portions of a stream in which both are active. Therefore it is an additional object of this invention to provide an improved device adapted to determine the voltage gradient within an electric field in a body of water.

It is another object of this invention to provide improved testing apparatus which may be safely used in electrified fluid media.

It is another object of this invention to provide improved voltage gradient measuring apparatus which will accurately determine the voltage gradients at predetermined points in a fluid body and in various directions within said body.

It is still another object of this invention to provide improved apparatus for determining voltage gradients within a fluid which may accurately and readily be adjusted for measurements at various depths and at a plurality of angles of both azimuth and elevation within the fluid body.

It is still another object of this invention to provide an improved voltage gradient measuring device which is simple and inexpensive to construct and has a minimum number of components.

Further and additional objects of this invention will become manifest from a consideration of this description, the accompanying drawings, and the appended claims.

In one form of this invention an elongated support is provided having a pair of electrodes mounted at one end thereof and a pair of conductors connected to said electrodes to provide an insulated electrical path to a voltage-indicating device supported outside of the fluid body.

More particularly, a device is provided by this invention for measuring voltage gradients in a fluid body wherein a pair of electrodes are mounted in spaced relationship at the end of an elongated support and adapted for immersion to any predetermined depth within such a fluid body and for rotation to various indicated angular positions with respect to the horizontal.

For a more complete understanding of the invention reference will now be made to the accompanying drawings, wherein Figure 1 is an illustration in elevation of one embodiment of this invention positioned in a fluid body;

Fig. 2 is an enlarged view of the embodiment of this invention shown in Fig. 1;

Fig. 3 is a top view of the apparatus of Fig. 2 showing the means for manually controlling the electrode positions;

Fig. 4 is an illustration of the depth control member of the embodiment of Fig. 2 taken along the line 4—4; and Fig. 5 is a view of the electrodes and electrode support of the embodiment of Fig. 2.

Referring now to the drawings, and more particularly to Fig. 1, a voltage gradient probe 10 is provided having an elongated support 22 carrying an electrode-supporting disc 30 at the lower end thereof and an indicating disc 20 at the upper end. A depth-indicating member 48 is adjustably secured to various positions along the support 22. The probe is illustrated partially immersed in a fluid body 12 whereby the voltage gradient existing in said fluid body may be determined. As shown in Fig. 1, the electrodes 14 and 16 of this apparatus are mounted in spaced relationship on the insulating disc 30 and are oriented in the plane of the drawing and in a horizontal line parallel to the water surface. Therefore, the voltage gradient in that line and at the particular depth illustrated is determined by this measurement. The spacing between electrodes 14 and 16 may be of any arbitrary value, but for this particular embodiment an electrode spacing of three inches was found desirable both for simplicity in the physical structure and for accurately determining the voltage gradient over a relatively short electrode gap. To arrive at a useful numerical value for the voltage gradient, the value measured by the voltmeter 18 of Fig. 1 is divided by 3, which is the electrode spacing in inches, whereby the average voltage gradient over a 3 inch span is registered in volts per inch. This data conversion may readily be performed by altering the face of the voltmeter 18 whereby voltage readings are automatically converted into a value equal to one-third of the actual voltage present between the electrodes 14 and 16.

By rotating the electrode positioning dial 20 which is mounted at the upper end of the elongated insulated support 22, the angular position of the disc 30 and consequently the axis of electrodes 14 and 16 is altered by means of the drive wire 32 whereby a voltage determination is made in a line other than the horizontal above described. By rotating the elongated support 22 about its longitudinal axis, voltage gradient measurements may readily be obtained in planes other than the plane of the drawing as illustrated here. A further adjustment for measuring still other voltage gradient field characteristics is provided by raising or lowering the position of the elongated support 22 whereby gradient measurements at predetermined depths may be made.

Referring now to Fig. 2, the elongated support 22 has a longitudinal aperture 23 therethrough through which a pair of conductors 24 and 26 pass. At the lower end of the support 22 the conductors 24 and 26 extend from the longitudinal bore through a hollow bolt 28 and are electrically connected to the electrodes 14 and 16. As shown in Fig. 1, the upper portions of conductors 24 and 26 extend through transverse aperture 25 to connect with meter 18. The electrodes 14 and 16 are secured in the insulating disc 30 which is freely mounted for rotation on bolt 28. A driving wire 32 is passed through a recess 34 in the periphery of disc 30 and is secured at one point 36 on the periphery to prevent slippage or relative movement between the disc 30 and the driving wire 32. Attachment at this point may readily be accomplished by use of means such as staple 38, as shown most clearly in Fig. 5.

As further shown in Fig. 5, a rectangular block 40 having a central circular aperture 42 therein is adapted to receive the hollow elongated support 22 to provide a flat backing surface 44 for the rotatable disc 30. A transverse aperture is formed through the block 40 to receive the hollow bolt 28, and the support 22 is correspondingly apertured to receive the said bolt. A nut or knob 46 is threaded to engage bolt 28 to prevent transverse motion of the bolt but is not in rigid engagement with the block 40.

Mounted on the support 22 is the depth-indicating member 48 which is more clearly illustrated in Fig. 4. The depth-indicating member has a clamp 50 mounted thereto which has a slot 52 formed through the major portion thereof and an aperture 54 in communication with the slot 52, said aperture having a diameter sufficient to pass the support 22 therethrough. A threaded hole is provided in one of the legs 56 which is formed by the slot 52, and a corresponding aligned hole is formed in the adjacent leg 58 of the clamp 50. A bolt 60 is passed through the hole in the leg 58 and threadably engages the threaded hole in the leg 56. Bolt 60 has a knurled knob 62 at the free end thereof which is adapted for finger tightening whereby the legs 56 and 58 are drawn together to close slot 52, thus rigidly clamping the support 22 within the aperture 54. Secured to the clamp 50 are two plates 64 and 66 which are of a clear plastic material to facilitate determining the exact position of the depth-indicating member 48. The contact of plates 64 and 66 with the water surface will be apparent and easily detectable by an observer as a result of the change of appearance of the transparent plates when the water wets the undersurface thereof. A pair of indicating levels 68 and 70 are mounted in perpendicular relationship on the clamp 50. The operator in utilizing this apparatus will observe the position of bubbles in the levels 68 and 70, as is well understood in the art, and thus the exact position of the support 22 with respect to the vertical may be determined. It is desired in taking voltage gradient data that the support 22 be maintained in a substantially vertical position, and therefore an operator will endeavor at all times to maintain the bubble 72 in a central position within the spirit level 68 and the bubble 74 within the center portion of spirit level 70.

As shown in Figs. 2 and 3, a block 76 is secured at the upper end of the support 22, said block having an aperture 78 formed partially therethrough to receive the terminal of the elongated support. A transverse aperture is also formed in the block 76 through which a threaded bolt 80 is passed on which a disc 20 is mounted for rotation. A knob 84 threadably engages the free end of bolt 80 and may be rotated to clamp disc 20 against the opposed surface 86 of block 76. The drive wire 32 passes around the periphery of disc 20 in a peripheral groove 88 formed therein. The drive wire 32 is secured to the disc 20 at one point. This may be accomplished by any one of a plurality of means, and a staple 90 engaging the periphery of disc 20 is merely shown as one possible means of attachment. Thus to position the electrodes at any predetermined angle with respect to the horizontal, the knob 84 is first rotated to allow free rotation of disc 20 on bolt 80. As more clearly shown in Fig. 2, disc 20 is then rotated to a position at which the indicia 92 formed on the periphery thereof indicates the desired electrode angle. The electrode angle will be indicated by the particular indicia appearing at any given time at a point aligned above the longitudinal axis of support 22. Rotation of the disc 20 will drive the wire 32 to effect similar rotation of the disc 30 supporting the electrodes 14 and 16. Knob 84 is then turned to clamp disc 20 in the predetermined position. Indicia 94 are formed on the elongated support 22 to indicate the position of the depth-indicating member 48 and consequently the depth to which electrodes 14 and 16 are immersed.

From the foregoing it can be seen that data can readily be accumulated whereby a complete picture of a three-dimensional electrical field may be established. By adjusting the angle of the electrodes 14 and 16 by rotation of the indicating dial 20 the voltage gradient along any line at a predetermined angle to the horizontal may be taken. By adjusting the position of the depth-indicating member 48 and subsequently maintaining said member at the water level, voltage gradients at various depths may be determined. Further, by rotating the elongated support 22 about its axis, voltage gradients in various positions of azimuth may be ascertained. By systematically varying the depth, angle, and azimuth of this apparatus, and recording the voltage data which appears on the meter 18, a complete analysis of field strength patterns is made available. From this data it can be determined if there are weak spots or voids in the electric field which would allow passage of predatory aquatic animals in an electric stream barrier and also whether or not the incremental field is such that the initial field would be excessive, thus creating an undue hazard for migratory game fish. Based upon this data it is possible to position the stream electrodes which produce the electric field or alter the stream bed characteristics to readjust the field pattern and thus assure protection of game fish while trapping, repelling or otherwise destroying predatory animals.

While this apparatus has herein been described as especially applicable in aquatic life control, it should be immediately manifest that the subject structure is equally useful in determining voltage gradients in any fluid body. Thus such a structure is useful in the electroplating and electrodeposition arts. Furthermore, it will be obvious that the above-described structure is merely one possible embodiment and that one skilled in the art may immediately envision various modifications and alterations which are believed to be within the scope of this invention. As an example, for additional strength it may be desirable to use a solid elongated support in place of the hollow support 22, and in that event the conductors 24 and 26 may be secured against the outer surface of the support or may be allowed to freely pass through the fluid to be connected to the meter terminals. Furthermore, it will be obvious that, depending upon the particular application, the support 22 may be of varying length, though here shown as a 48-inch column subdivided into one-inch increments, and that the electrode spacing may be any desired gap, depending upon the variability of the field strength and the accuracy with which it is desired to make gradient determinations.

Ideally, the measuring apparatus would be constructed of materials having the same electrical characteristics as the surrounding medium. As this is impossible, the apparatus is constructed of insulating materials which will produce a minimum effect upon the field pattern. However, parts of the structure may be metallic, if so desired, provided only that the electrodes always remain in electrical isolation. It should be clear that wherever the terms "insulated," "insulator" or "insulating" are used in this specification, what is meant is a material having a high resistance to the flow of an electric current therethrough.

Without further elaboration, the foregoing will so fully explain the character of our invention that others may, by applying current knowledge, readily adapt the same for use under varying conditions of service, while retaining certain features which may properly be said to constitute the essential items of novelty involved, which items are intended to be defined and secured to us by the following claims.

We claim:

1. A probe for measuring the voltage gradient in a fluid comprising an elongated insulated support, a pair of electrodes equally spaced from and rotatable about an axis transverse to and disposed at one end of said elongated support, a pair of conductors, a voltage indicating device, each of said conductors being connected from one of said electrodes to one terminal of said voltage indicating device, a fluid depth indicating plate adjustably secured to said elongated support and movable along its length, and means at the other end of said elongated support for rotating said electrodes about said axis.

2. A probe for measuring the voltage gradient in a fluid comprising an elongated insulated support, an insulating member pivotally mounted for rotation about an axis transverse to and disposed at one end of said elongated support, a pair of electrodes mounted on said insulated member in spaced relationship, a pair of conductors, a voltage indicating device, each of said conductors being connected from one of said electrodes to one terminal of said voltage indicating device, a fluid depth indicating plate adjustably secured to said elongated support and movable along its length, and means at the other end of said elongated support for rotating said insulating member about its axis.

3. A probe for measuring the voltage gradient in a fluid comprising an elongated insulated support, an insulating member pivotally mounted for rotation about an axis transverse to and disposed at one end of said elongated support, a pair of electrodes mounted on said insulating member in spaced relationship, a pair of conductors, a voltage indicating device, each of said conductors being connected from one of said electrodes to one terminal of said voltage indicating device, a fluid depth indicating plate adjustably secured to said elongated support and movable along its length, rotatable position indicating means mounted at the other end of said support, and means operatively connecting said insulating member and said position indicating means whereby corresponding motion of said insulating member is produced for a rotation of said indicating means.

4. The probe of claim 3 having angular graduations impressed upon the indicating means to indicate the position of the electrodes.

5. The probe of claim 4 wherein the indicating means is a pivotally mounted transparent disc with the angular graduations impressed about the periphery thereof.

6. A probe for measuring the voltage gradient in a fluid comprising an elongated insulated support, an insulating member pivotally mounted for rotation about an axis transverse to and disposed at one end of said elongated support, a pair of electrodes mounted on said insulating member in spaced relationship, a pair of conductors, a voltage indicating device, each of said conductors being connected from one of said electrodes to one terminal of said voltage indicating device, a fluid depth indicating plate adjustably secured to said elongated support and movable along its length, rotatable position indicating means mounted at the other end of said support, locking means for selectively securing said indicating means in a plurality of positions to prevent rotation with respect to said elongated member, and means operatively connecting said insulating member and said position indicating means whereby corresponding motion of said insulating member is produced for a rotation of said indicating means.

7. The probe of claim 6 having indicia on said elongated support to indicate the depth to which said electrodes are submerged.

8. A probe for measuring the voltage gradient in a fluid comprising an elongated insulated support, an insulating member pivotally mounted for rotation about an axis transverse to and disposed at one end of said elongated support, a pair of electrodes mounted on said insulating member in spaced relationship, a pair of conductors, a voltage indicating device, each of said conductors being connected from one of said electrodes to one terminal of said voltage indicating device, a fluid depth indicating plate adjustably secured to said elongated support and movable along its length, rotatable position indicating means mounted at the other end of said support, indicating means for determining the position of said fluid depth indicating plate with respect to the horizontal, and means operatively connecting said insulating member and said position indicating means whereby corresponding motion of said insulating member is produced for a rotation of said indicating means.

9. The probe of claim 8 wherein the indicating means is a pair of spirit levels mounted in the plane of said fluid depth indicating plate and relatively perpendicular.

10. The probe of claim 6 in which the locking means comprises a threaded bolt secured to said elongated support on which said indicating means is freely mounted and a correspondingly threaded knob engageable with said indicating means to prevent rotation thereof.

References Cited in the file of this patent

UNITED STATES PATENTS

| Number | Name | Date |
| --- | --- | --- |
| 2,437,134 | Smith | Mar. 2, 1948 |
| 2,461,111 | Flinspach et al. | Feb. 8, 1949 |
| 2,569,818 | Lee | Oct. 2, 1951 |